(12) United States Patent
Tredez

(10) Patent No.: US 7,267,363 B2
(45) Date of Patent: Sep. 11, 2007

(54) AIR-BAG UNIT MOUNTED ON A SEAT

(75) Inventor: Jean Yves Tredez, Beauvals (FR)

(73) Assignee: Autoliv Development AB, Vargarda (SE)

( * ) Notice: Subject to any disclaimer, the term of this patent is extended or adjusted under 35 U.S.C. 154(b) by 349 days.

(21) Appl. No.: 10/816,029

(22) Filed: Apr. 1, 2004

(65) Prior Publication Data

US 2004/0239081 A1 Dec. 2, 2004

(30) Foreign Application Priority Data

Apr. 2, 2003 (EP) .................................. 03252098

(51) Int. Cl.
*B60R 21/16* (2006.01)
(52) U.S. Cl. .................. 280/730.2; 280/728.3
(58) Field of Classification Search ............. 280/728.3, 280/730.2, 728.2
See application file for complete search history.

(56) References Cited

U.S. PATENT DOCUMENTS

| | | | |
|---|---|---|---|
| 5,499,840 A | | 3/1996 | Nakano |
| 5,503,428 A | | 4/1996 | Awotwi et al. |
| 5,542,691 A | | 8/1996 | Marjanski et al. |
| 5,683,101 A | * | 11/1997 | Davis et al. ............. 280/728.3 |
| 5,779,263 A | | 7/1998 | Lane, Jr. et al. |
| 5,803,485 A | | 9/1998 | Acker et al. |
| 5,816,610 A | * | 10/1998 | Higashiura et al. ...... 280/728.3 |
| 5,845,930 A | * | 12/1998 | Maly et al. .............. 280/728.3 |
| 5,951,039 A | * | 9/1999 | Severinski et al. ...... 280/730.2 |
| 6,045,151 A | | 4/2000 | Wu |
| 6,062,593 A | | 5/2000 | Satani et al. |
| 6,126,192 A | | 10/2000 | Enders |
| 6,234,518 B1 | * | 5/2001 | Ryl et al. ................ 280/730.2 |
| 6,386,577 B1 | * | 5/2002 | Kan et al. ............... 280/730.2 |
| 6,554,312 B2 | * | 4/2003 | Sakane et al. ........... 280/728.2 |
| 2002/0024198 A1 | | 2/2002 | Umezawa et al. |

FOREIGN PATENT DOCUMENTS

| | | |
|---|---|---|
| DE | 197 25 684 C1 | 6/1997 |
| EP | 0 818 365 A1 | 1/1998 |
| EP | 0 826 565 A2 | 3/1998 |
| EP | 0 940 299 A1 | 9/1999 |
| EP | 1 167 132 A2 | 1/2002 |
| EP | 1 279 555 A2 | 1/2003 |
| EP | 1 433 667 A2 | 6/2004 |
| JP | 2000-85515 | 3/2000 |
| JP | 2001-114060 | 4/2001 |

* cited by examiner

*Primary Examiner*—Paul N. Dickson
*Assistant Examiner*—Tiffany Webb
(74) *Attorney, Agent, or Firm*—Brinks Hofer Gilson & Lione

(57) ABSTRACT

An air-bag assembly for a vehicle including an air-bag unit mounted on a seat. The air-bag unit is connected to a mounting member. The mounting member is secured to or forms part of the structure of the seat. The air-bag unit has a first set of locking formations and the mounting member has a second set of locking formations. The locking formations of one of the sets are apertures and the locking formations of the other of the sets are projections. Each aperture at least partially receives a respective projection. A spring is mounted to either the mounting member or the air-bag unit so as to extend across each of the apertures to form a snap-connection between the air-bag unit and the mounting member near each aperture.

8 Claims, 3 Drawing Sheets

AIR-BAG UNIT MOUNTED ON A SEAT

CROSS REFERENCE TO RELATED APPLICATION

This application claims priority to EP 0352098.3 filed Apr. 2, 2003, which is currently pending.

BACKGROUND OF THE INVENTION

The present invention relates to an air-bag unit mounted on a seat. It is known to provide a motor vehicle with an air-bag unit mounted on a seat provided within the vehicle. It is common for such an arrangement to comprise an air-bag unit mounted to one side of a back-rest of a vehicle seat so that upon actuation of the air-bag unit, for example upon receipt of a signal from a crash sensor indicative of a side impact or roll-over situation, the air-bag will inflate in a forwards direction so as to lie between an occupant of the seat and the side of the motor vehicle, thereby providing protection to the seat occupant in such a crash situation.

It is known to secure air-bag units of the general type mentioned above to the outboard part of the structural frame of a back-rest of the seat using bolts, screws or rivets, thereby providing a rigid and secure connection between the air-bag unit and the vehicle seat. However, this type of arrangement has been found to be disadvantageous because it is inconvenient for a person installing the air-bag unit to use tools to install the screws, bolts or rivets in what can sometimes be a cramped space within a cavity provided in the upholstery of the seat back-rest. This inconvenience has the effect of making installation a lengthy process.

Accordingly, the present invention provides an air-bag unit mounted on a seat, the air-bag unit being connected to a mounting member secured to or forming part of the structure of the seat; wherein one of said air-bag unit and said mounting member carries a spring, and the other of said air-bag unit and said mounting member carries a plurality of projections; each said projection being configured to engage said spring to form a snap connection between the air-bag unit and the mounting member.

Preferably, the air-bag unit has a first set of locking formations and the mounting member has a second set of locking formations, the locking formations of one of said sets being apertures and the locking formations of the other of said sets being projections, each said aperture at least partially receiving a respective said projection; said spring being mounted to said mounting member or said air-bag unit to extend across each of said apertures and to form a snap connection between said air-bag unit and said mounting member in the region of each aperture.

Preferably, each projection has a side recess spaced from the free end thereof to form a snap connection with the spring, when the projection is received within a respective aperture.

Advantageously, said apertures are formed through part of the mounting member and at least part of said spring is located inboard of part of a frame of the seat on the opposite side of said mounting member to the air-bag unit.

Preferably, said apertures are formed through part of said mounting member and said spring is mounted to said mounting member by a plurality of ears extending from said mounting member.

Advantageously, said mounting member comprises a mounting plate, each ear having an initial portion extending from the mounting plate and a terminal portion parallel with the mounting plate.

Preferably, said apertures are formed through part of the mounting member and said spring is mounted between said projections provided on said air-bag unit.

Conveniently, said mounting member is provided with a plurality of ears extending from said mounting member to engage said spring to form said snap connections.

Advantageously, the mounting member defines part of a frame of the seat.

So that the invention may be more readily understood, and so that further features thereof may be appreciated, embodiments of the present invention will now be described, by way of example, with reference to the accompanying drawings, in which:

DETAILED DESCRIPTION OF THE INVENTION

Figure 1:
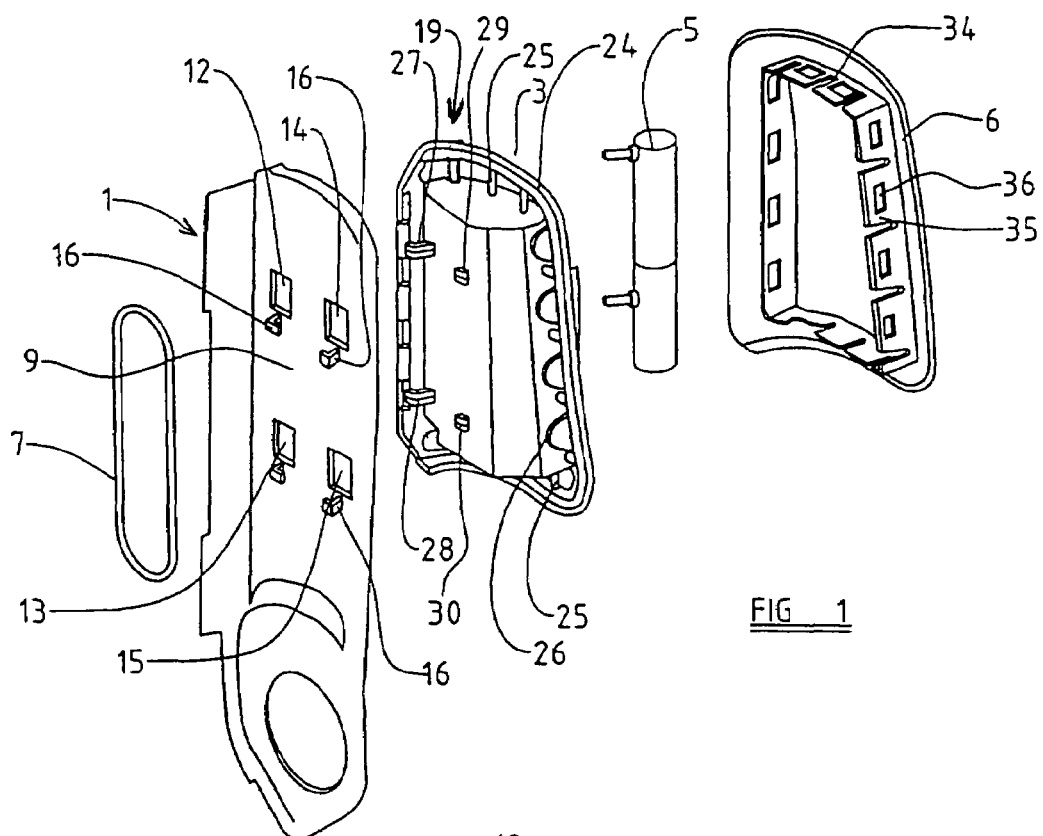
FIG. 1 is an exploded perspective view, from inboard and in front, of an air-bag unit mounted to part of the back-rest of a seat.

Referring initially to FIG. 1, there is illustrated, in exploded view, the principal components of an air-bag assembly provided on the back-rest of a motor vehicle seat. These components include a mounting member 1 which takes the form of a side part of the structure or frame of the back-rest of the vehicle seat, and an air-bag unit 2 provided for snap connection to the outboard side of the mounting member 1. The air-bag unit 2 comprises a housing 3 defining an interior volume 4 (illustrated in FIG. 2) to accommodate a rolled or folded air-bag (not shown) and an inflator 5 which preferably takes the form of a gas-generator (the inflator 5 not being illustrated in FIG. 2). A cover 6 is provided for engagement with the housing 3 in order to retain the air-bag and inflator 5 within the volume 4 and behind the cover 6.

A spring 7 in the form of an elongate closed loop of metal wire or other convenient resilient material is provided on the inboard side of the mounting member 1, for reasons that will be explained hereinafter.

As indicated above, the mounting member 1 forms part of a frame of the back-rest of a motor vehicle seat. The back-rest also comprises padded upholstery 8 which typically takes the form of synthetic foam material.

Figure 2:
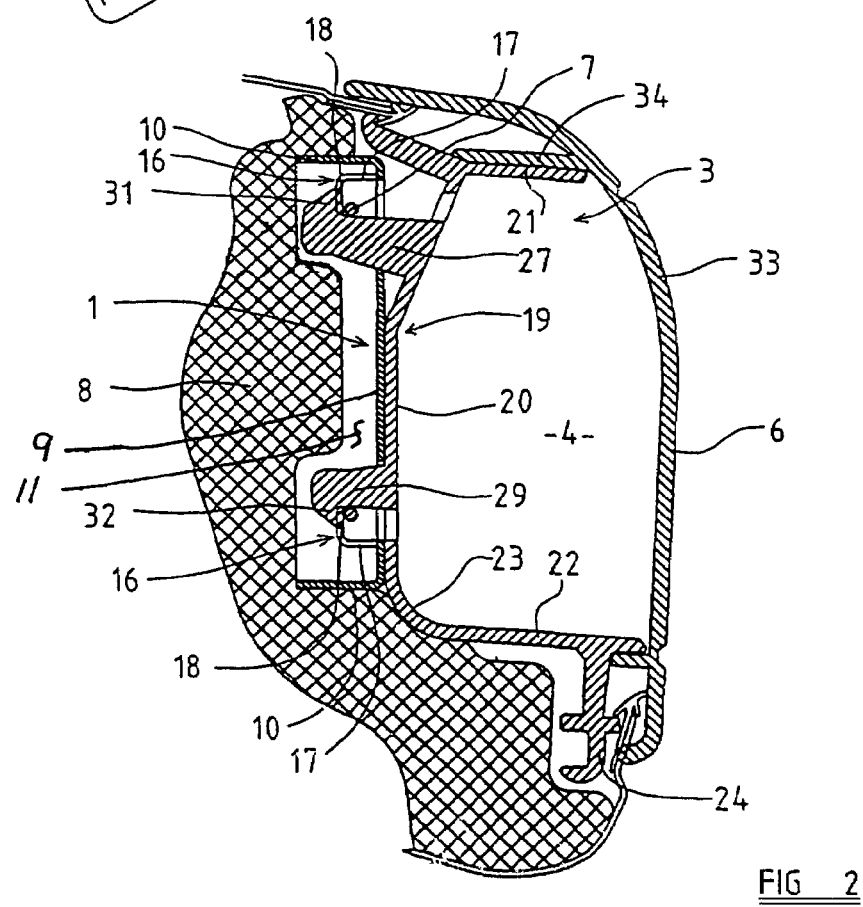
FIG. 2 is a sectional view through the assembled arrangement of FIG. 1.

As illustrated most clearly in FIG. 2, the mounting member 1 generally takes the configuration of a mounting plate having a planar region and a pair of inwardly-directed flanges 10 along its front and rear edges. It should be noted that, in FIG. 2, the front of the back-rest is illustrated at the bottom of the drawing, and the rear of the back-rest is illustrated at the top of the drawing. The flanges 10 therefore extend inboard of the mounting member 1. It will therefore be seen that the mounting member 1 has a generally C-shaped cross-section. The lower part of the mounting member 1 as illustrated in FIG. 1 is configured to lie adjacent a recliner mechanism (not illustrated), which pivotally connects the seat cushion and backrest of the vehicle seat. The mounting member extends up the outer side of the back-rest.

The upholstery 8 engages or is secured to the outermost faces of the inwardly-directed flanges 10 and extends inboard and rearwardly from the mounting member 1. As illustrated in FIG. 2, a cavity 11 is defined between the upholstery 8 and a mounting plate 9 of the mounting member 1 on the inboard side of the mounting member 1.

As illustrated most clearly in FIG. 1, a plurality of substantially rectangular apertures are provided through the planar region of mounting plate 9 of the mounting member 1. The particular arrangement illustrated in FIGS. 1 and 2 is provided with four such apertures 12, 13, 14, 15 provided at the corners of an imaginary rectangle. Two of these apertures 12, 13 are provided one above the other generally adjacent the rearward inwardly-directed flange 10. The other two apertures 14,15 are provided generally adjacent the forwardmost inwardly-directed flange 10.

Projecting inwardly from the mounting plate 9 there are provided a plurality of retaining ears 16. Each ear 16 has an initial portion 17 extending from the planar region 9 in an inboard direction and a terminal portion 18 which lies substantially parallel with the mounting plate 9. The ears 16 serve to engage and retain the spring 7 with respect to the mounting member 1 such that the spring 7 is located inboard of the plate 9 (illustrated in FIG. 2) and such that portions of the spring 7 extend across each aperture 12, 13, 14, 15.

The housing 3 comprises a moulded plastic body part 19 having a base wall 20 and a pair of spaced-apart outwardly-directed side walls 21, 22. The base wall 20 has a forwardmost first region which is substantially perpendicular to the front side wall 22 and is connected thereto by a curved corner edge 23. The rearward region of the base wall 20 is also planar but is angled with respect to the front part of the base wall 20 so as to extend in a rearward and outboard direction to a point where it joins the rearmost side wall 21.

As illustrated most clearly in FIG. 1, the housing 3 also comprises a peripheral rim 24 which extends around the body part 19, being connected to the body part and spaced from the body part by a plurality of posts 25. Formed around the periphery of the body part 19, at positions between adjacent posts 25, are a plurality of spaced-apart outwardly-projecting locking elements 26.

As illustrated most clearly in FIG. 1, the regions of the peripheral rim 24 which extend above and below the body part 19 are slightly curved such that the forwardmost part of the rim 24 is located adjacent the outboard end of the front side wall 22, whilst the rearmost part of the rim 24 lies inboard of the rearmost side wall 21, so as to be substantially aligned with the front part of the base wall 20.

The inboard surface of the body part 19 carries four inwardly-directed locking formations 27, 28, 29 and 30 which each take the form of a hook.

Each locking formation has a projection with a recess formed in the side of the projection at a point spaced from the free end of the projection. Instead of being hook shaped each projection could have a side recess in the form of a peripheral groove surrounding the projection. Each projection has a chamfered free end for a purpose that will become clear from the following description.

The locking formations 27, 28, 29, 30 are provided at the corners of an imaginary rectangle having the same orientation and dimensions as the rectangle defined by the apertures 12, 13, 14,15 provided through the mounting member 1.

Two of these locking formations 27, 28 are provided one above the other and extend inboard from the rearmost angled region of the base wall 20. The other locking formations 29, 30 extend inwardly from the front region of the base wall 20. As can be seen from FIG. 2, the rearmost locking formations 27, 28 (only 27 being illustrated in FIG. 2) terminate with a respective forwardly-directed hook part 31. Similarly, the forwardmost locking formations 29, 30 terminate with a rearwardly-directed hook formation 32.

The cover 6 comprises a curved wall part 33 from which a substantially rectangular collar 34 extends inwardly. At least around part of its extent, the collar 34 is sub-divided into a number of inwardly-directed tongue portions 35, each of which has an aperture 36 formed through it.

The cover 6 can then be offered up to the body part 19 and engaged therewith such that the collar 34 carried by the cover 6 is received over the body part 19 but within the peripheral rim 24. Each tongue 35 of the collar 34 is received between a respective pair of adjacent posts 25 carried by the body part 19 and the apertures 36 provided through the tongues 35 each engage a respective locking element 26 as a snap-fit.

In order to mount the air-bag housing 3 to the vehicle seat, the body part 19 is then offered up to the outboard face of the mounting plate 9 such that the inwardly-directed projections or hooks 27, 28, 29, 30 are aligned with respective apertures 12, 13, 14, 15 provided through the mounting member 1. The body part 19 is then moved towards the mounting plate 9 in an inboard direction so that each hook passes through a respective aperture. The hook formations 31, 32 therefore engage the regions of the spring 7 extending across the respective apertures 12, 13, 14, 15 and because of the chamfered configuration of the hook parts 31, 32, they urge these regions of the spring outwardly against the inherent resilience of the spring so that the hook formations 31, 32 can be pushed entirely past the spring 7 in an inboard direction. The spring 7 thereafter snaps back towards its initial configuration and hence adopts the position illustrated in FIG. 2 in which the spring 7 engages the outermost surface of the hook parts 31, 32. The spring therefore provides a snap connection with the locking projections 27, 28, 29, 30 carried by the body part 19 of the housing 3. In this configuration, it will be seen that the front region of the base wall 20 bears against the outboard face of the mounting member 1.

Figure 3:
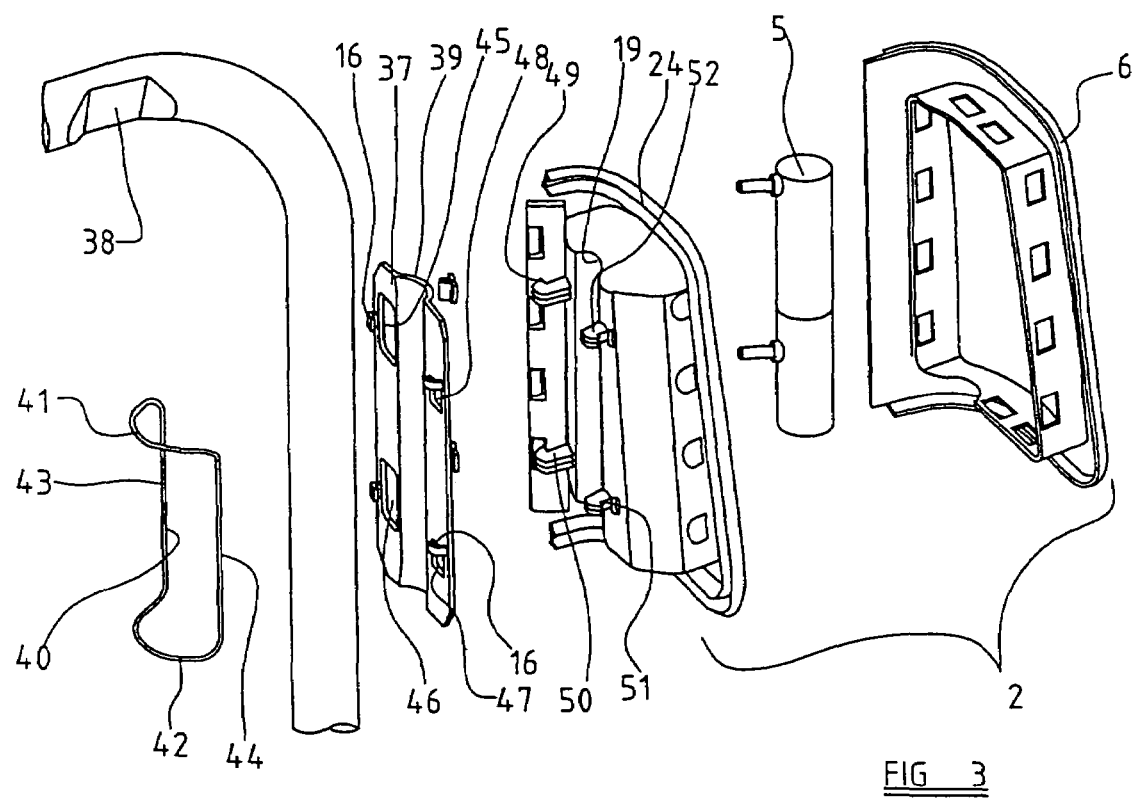
FIG. 3 is an exploded perspective view from inboard and in front of an alternative configuration of an air-bag unit mounted to part of a back-rest of a vehicle seat.
Figure 4:
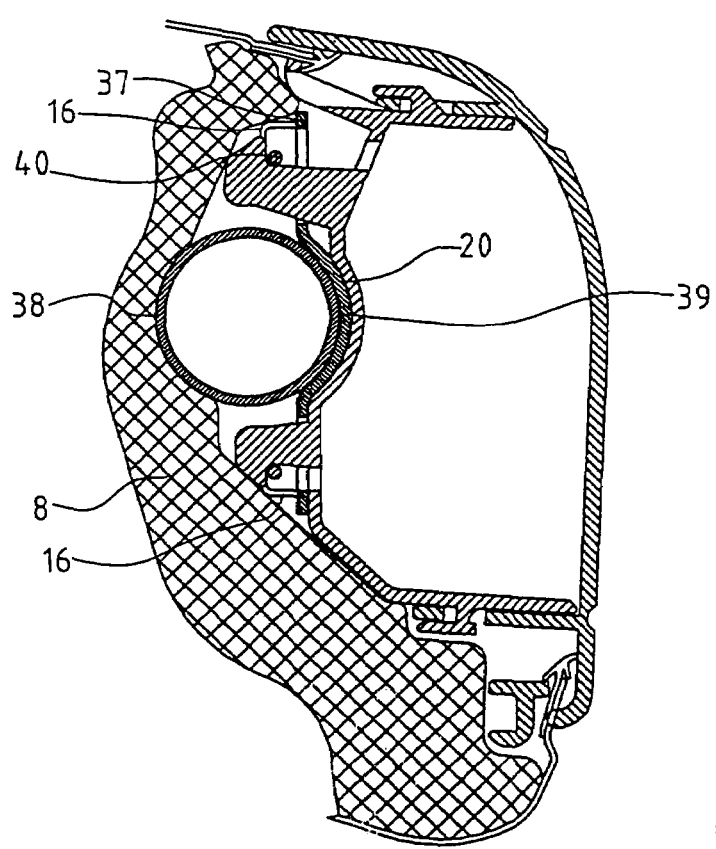
FIG. 4 is a sectional view through the assembled arrangement illustrated in FIG. 3.

FIGS. 3 and 4 illustrate an alternative arrangement for mounting an air-bag unit to the structure of a seat. In many respects, the arrangement illustrated in FIGS. 3 and 4 is very similar to that illustrated in FIGS. 1 and 2. However, the principal difference with the arrangement of FIGS. 3 and 4 is that instead of the body part 19 of the housing being connectable directly to part of the frame of the vehicle seat, it is connected to an alternative configuration of mounting plate 37 which is itself securable to the structural frame 38 of the back-rest of the seat. In the arrangement illustrated, the mounting plate 37 is securable to a tubular frame 38.

In this arrangement, the mounting plate 37 comprises a plate defining a shallow vertical groove 39. The groove 39 is sized and configured to receive and conform to the outer profile of part of the tubular frame 38.

Located inboard of the tubular frame 38 is a spring 40 which is effectively a modified version of the spring 7 illustrated in FIG. 1, wherein the two end regions of the spring 7 are bent in an inboard direction so as to define upper and lower curved spring regions 41, 42 interconnecting the linear and parallel spring regions 43, 44.

The mounting plate 37 is offered up to the tubular frame 38 such that part of the frame is received within the groove 39 as illustrated in FIG. 4. The spring 40 is then offered up to the frame 38 and mounting plate from an inboard position and is mounted to the plate 37 by engagement with the inwardly directed ears 16 carried by the plate 37 in the same manner as in the arrangement illustrated in FIGS. 1 and 2. It will therefore be appreciated that the tubular frame 38 will thus extend between the arcuate upper and lower regions 41, 42 of the spring 40 and the plate 37.

Also, in the arrangement illustrated in FIGS. 3 and 4, the mounting plate 37 is provided with four apertures 45, 46, 47, 48, in the same manner as illustrated in the embodiment described with reference to FIGS. 1 and 2. In the arrangements of FIGS. 3 and 4, the four apertures are located at the corners of an imaginary rectangle, such that a pair of apertures 45, 46 are defined one above the other near the rearmost edge of the mounting plate 37, whilst another pair of apertures 47, 48 are defined one above the other adjacent the front edge of the mounting plate 37. As will be seen from FIG. 3, the four apertures are each substantially rectangular, but the two rearmost apertures 45, 46 are slightly larger than the front apertures 47, 48.

The mounting plate 37 can either be secured to the tubular frame 38 by engagement with the spring 40 alone or, to ensure more secure attachment to the frame 38, the mounting plate 37 can be screwed, bolted, riveted or welded to the frame 38.

The body part 19 of the arrangement illustrated in FIGS. 3 and 4 is again generally identical to that of the arrangement illustrated in FIGS. 1 and 2 except for one difference. This is, that in the arrangement of FIGS. 3 and 4, the base wall 20 of the body part 19 defines a vertical groove having a similar configuration to the vertical groove 39 provided on the mounting plate 37. The groove defined by the base wall 20 is configured to conform to the outer surface of the mounting plate 37 in the region of its groove 39.

The body part 19 of the arrangement illustrated in FIGS. 3 and 4 is again provided with four inwardly directed locking formations in the form of hooks, 49, 50, 51, 52. These hooks are arranged at the corners of an imaginary rectangle having the same orientation and dimensions as the notional rectangle defined by the apertures 45, 46, 47, 48, defined through the mounting plate 37.

The gas generator 5 and cover 6 of the arrangement illustrated in FIGS. 3 and 4 are generally identical to those illustrated in the arrangement of FIGS. 1 and 2.

The body part 19 of the alternative arrangement illustrated in FIGS. 3 and 4 is offered up to the mounting plate 37 once the mounting plate 37 has been secured to the frame 38. The hook formations 49, 50, 51, 52 are oriented so as to be received through the respective apertures 45, 46, 47, 48 and so, as the body part 19 is moved towards the mounting plate 37, the hooks pass through the respective apertures and engage the regions of the spring 40 extending across the apertures formed through the mounting plate 37 in an identical manner to that of the first described arrangement. Therefore, the spring 40 again provides a snap-connection with the locking hooks carried by the body part 19 of the housing. FIG. 4 illustrates the body part 19 connected in this way to the mounting plate 37 and it will be seen that the outer surface of the mounting plate 37 in the region of its groove 39 bears intimately against the grooved portion of the base wall 20.

Figure 5:
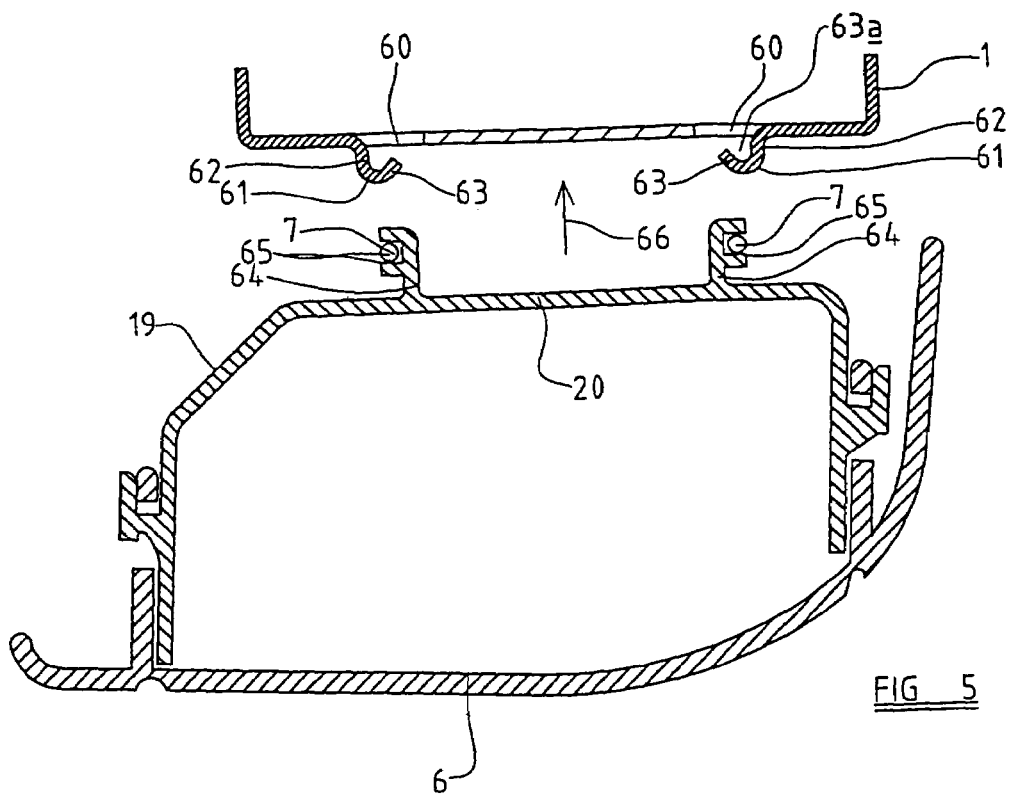
FIG. 5 is a sectional view through an alternative configuration, showing an air-bag unit being offered up to part of a back-rest of a vehicle seat for connection thereto.

FIG. 5 illustrates another alternative arrangement for mounting an air-bag unit to the structure of a seat. In this arrangement, the mounting member 1 takes the form of a side part of the structure or forms part of the back-rest of the vehicle seat and is again provided with a plurality of apertures 60 therethrough. The apertures 60 are again preferably provided at the corners of an imaginary rectangle, so as to have the same general layout as the apertures 12, 13, 14, 15 provided through the mounting member 1 of the arrangement illustrated in FIG. 1.

In the FIG. 5 arrangement, the mounting member 1 has a plurality of projections in the form of outwardly-directed ears 61, each of which has an initial portion 62 extending from the mounting member 1 in an outboard direction, and a terminal portion 63 which is directed inwardly such that each ear 61 takes the form of a hook extending partially across a respective aperture 60. It will be seen that each hook defines a side recess 63a spaced from its free end.

The body part of the air-bag housing 19 has a generally planar base wall 20 making it similar in this respect to the body part of the arrangement illustrated in FIG. 1. However, in the arrangement of FIG. 5, four inwardly-directed locking projections 64 extend in an inboard direction from the base wall 20. The four locking projections 64 are each again arranged at the corners of an imaginary rectangle having the same orientations and dimensions as the imaginary rectangle defined by the apertures 60 defined through the mounting member 1. As clearly illustrated in FIG. 5, each locking formation 64 has a generally "F"-shaped configuration so as to define an outwardly-directed channel 65 spaced inboard from the base wall 20 of the body part 19. A spring 7, having a configuration generally identical to that illustrated in FIG. 1, is received within the open channel 65 of each projection 64 so as to be carried by the body part 19 between the locking projections.

FIG. 5 illustrates the air-bag unit being offered up to the mounting member 1 by movement in an inboard direction along arrow 66. The body part 19 of the air-bag unit is offered up to the mounting member 1 such that each locking projection 64 carried by the body part 19 is aligned with a respective ear 61 and optionally also aligned with a respective aperture 60 formed through the mounting member 1. As the body part 19 is moved towards the mounting member 1 in this manner, the spring 7 bears against the outermost inclined surfaces of the inwardly-directed terminal parts 63 of the ears 61. This causes the spring 7 to be deformed so as to allow it to pass over the ears 61, and, in the event that the locking projections are also aligned with respective apertures, to permit the most inboard parts of the locking projections 64 to be at least partially received within respective apertures 60. In this position, the spring 70 snaps back to its initial configuration, in which it engages the side recess 63a of each ear 61 as a snap-fit, as illustrated, for example, in FIG. 6.

Figure 6:
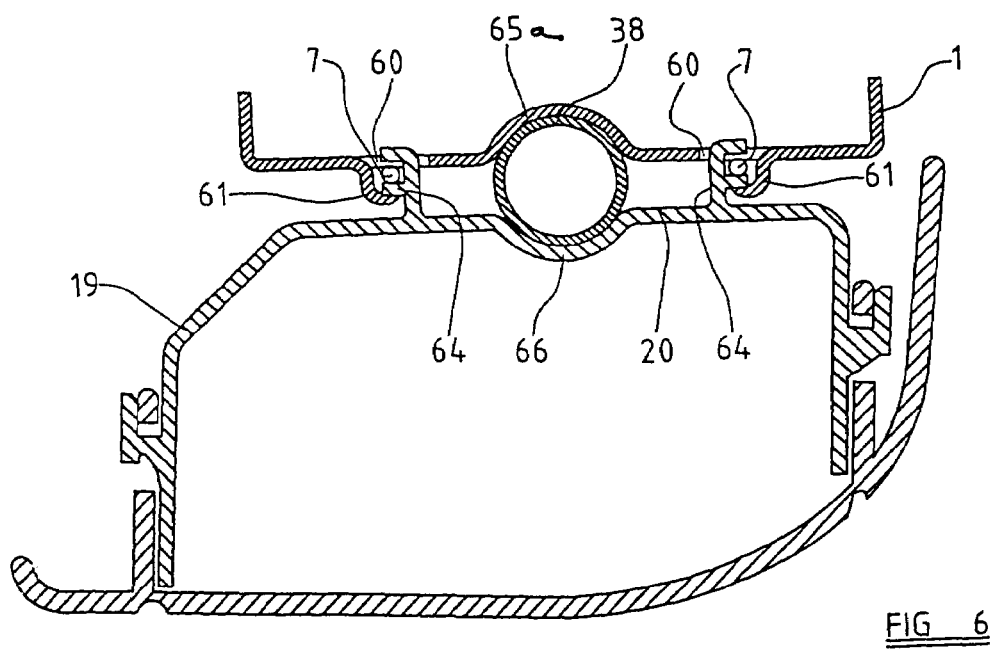
FIG. 6 is a view corresponding generally to that of FIG. 5, but illustrating a modified form of the air-bag unit connected to a modified form of the back-rest.

However, whilst the snap-fit connection between the spring 7 and the locking ears 61 of the arrangement illustrated in FIG. 6 is identical to those of the arrangement illustrated in FIG. 5, it will be noted that the mounting member 1 and the body part 19 illustrated in FIG. 6 have a slightly different configuration than those illustrated in FIG. 5. In the arrangement illustrated in FIG. 6, the mounting member 1 has an inwardly-directed shallow vertical groove 65a which is sized and configured to receive and conform to the outer profile of part of a tubular seat frame 38 of the same general configuration to that illustrated in the arrangement of FIG. 3. Similarly, the base wall 20 of the body part 19 is also provided with a shallow vertical groove 66 which is again configured to conform to the outer profile of the tubular frame 38. It will therefore be understood that in the arrangement of FIG. 6, the mounting member 1 is formed separately from the frame 38 of the vehicle seat and is connected to the body part 19 such that the tubular frame 38 is effectively trapped between the mounting member 1 and the body part 19 of the air-bag module. In a similar way as in the arrangement of FIG. 3, the mounting member 1 can additionally be secured to the frame 38 by the use of screws, bolts, rivets or welds.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An air-bag assembly mounted on a seat of a vehicle, the air-bag assembly comprising: an air-bag unit being connected to a mounting member secured to or forming part of a structure of the seat, wherein one of the air-bag unit and the mounting member carries a spring and the other of the air-bag unit and the mounting member carries a plurality of projections, the projections being configured to engage the spring to form a snap connection between the air-bag unit and the mounting member;

the air-bag unit includes a first set of locking formations and the mounting member has a second set of locking formations, the locking formations of one of the first or second sets of locking formations being apertures and the locking formations of the other of the first or second sets being projections, the apertures at least partially receiving a respective one of the projections, the spring being mounted to the mounting member or the air-bag unit and extending across the apertures to form the snap connection between the air-bag unit and the mounting member in the region of the apertures; and the projections have a side recess spaced from a free end of the projections to form the snap connection with the spring when the projection is received within a respective one of the apertures.

2. An air-bag assembly according to claim 1 wherein the apertures are formed through part of the mounting member and the spring is mounted between the projections provided on the air-bag unit.

3. An air-bag assembly mounted on a seat of a vehicle, the air-bag assembly comprising: an air-bag unit being connected to a mounting member secured to or forming part of a structure of the seat, wherein one of the air-bag unit and the mounting member carries a spring and the other of the air-bag unit and the mounting member carries a plurality of projections, the projections being configured to engage the spring to form a snap connection between the air-bag unit and the mounting member;

the air-bag unit includes a first set of locking formations and the mounting member has a second set of locking formations, the locking formations of one of the first or second sets of locking formations being apertures and the locking formations of the other of the first or second sets being projections, the apertures at least partially receiving a respective one of the projections, the spring being mounted to the mounting member or the air-bag unit and extending across the apertures to form the snap connection between the air-bag unit and the mounting member in the region of the apertures; and the apertures are formed through part of the mounting member and at least part of the spring is located inboard of a part of a seat frame on the opposite side of the mounting member to the air-bag unit.

4. An air-bag assembly mounted on a seat of a vehicle, the air-bag assembly comprising: an air-bag unit being connected to a mounting member secured to or forming part of a structure of the seat, wherein one of the air-bag unit and the mounting member carries a spring and the other of the air-bag unit and the mounting member carries a plurality of projections, the projections being configured to engage the spring to form a snap connection between the air-bag unit and the mounting member;

the air-bag unit includes a first set of locking formations and the mounting member has a second set of locking formations, the locking formations of one of the first or second sets of locking formations being apertures and the locking formations of the other of the first or second sets being projections, the apertures at least partially receiving a respective one of the projections, the spring being mounted to the mounting member or the air-bag unit and extending across the apertures to form the snap connection between the air-bag unit and the mounting member in the region of the apertures; and the apertures are formed through part of the mounting member and the spring is mounted to the mounting member by a plurality of ears extending from the mounting member.

5. An air-bag assembly according to claim 4 wherein the mounting member comprises a mounting plate, the ears having an initial portion extending from the mounting plate and a terminal portion parallel with the mounting plate.

6. An air-bag assembly mounted on a seat of a vehicle, the air-bag assembly comprising: an air-bag unit being connected to a mounting member secured to or forming part of a structure of the seat, wherein one of the air-bag unit and the mounting member carries a spring and the other of the air-bag unit and the mounting member carries a plurality of projections, the projections being configured to engage the spring to form a snap connection between the air-bag unit and the mounting member; and the mounting member being provided with a plurality of ears extending from the mounting member to engage the spring to form the snap connection.

7. An air-bag assembly mounted on a seat of a vehicle, the air-bag assembly comprising: an air-bag unit being connected to a mounting member secured to or forming part of a structure of the seat, wherein one of the air-bag unit and the mounting member carries a spring and the other of the air-bag unit and the mounting member carries a plurality of projections, the projections being configured to engage the spring to form a snap connection between the air-bag unit and the mounting member, the mounting member defining part of a frame of the seat.

8. An air-bag assembly mounted on a seat of a vehicle, the air-bag assembly comprising: an air-bag unit being connected to a mounting member defining a part of a frame of the seat, one of the air-bag unit and the mounting member carrying a spring and the other of the air-bag unit and the mounting member carrying a plurality of projections, the projections being configured to engage the spring to form a snap connection between the air-bag unit and the mounting member.

* * * * *